United States Patent
Kassibrahim

(10) Patent No.: US 8,079,326 B2
(45) Date of Patent: Dec. 20, 2011

(54) TEATCUP

(75) Inventor: Jan Kassibrahim, Stockholm (SE)

(73) Assignee: DeLaval Holding AB, Tumba (SE)

( * ) Notice: Subject to any disclaimer, the term of this patent is extended or adjusted under 35 U.S.C. 154(b) by 482 days.

(21) Appl. No.: 12/302,913

(22) PCT Filed: Apr. 4, 2007

(86) PCT No.: PCT/SE2007/050218
§ 371 (c)(1),
(2), (4) Date: Jan. 30, 2009

(87) PCT Pub. No.: WO2007/139481
PCT Pub. Date: Dec. 6, 2007

(65) Prior Publication Data
US 2009/0235868 A1    Sep. 24, 2009

(30) Foreign Application Priority Data
May 31, 2006    (SE) ...................... 0601203

(51) Int. Cl.
*A01J 5/06* (2006.01)
(52) U.S. Cl. .................................... 119/14.49
(58) Field of Classification Search ..... 119/14.47–14.53
See application file for complete search history.

(56) References Cited

U.S. PATENT DOCUMENTS

| | | | | |
|---|---|---|---|---|
| 1,705,292 A * | 3/1929 | Horthy et al. | ............... | 119/14.47 |
| 1,995,283 A * | 3/1935 | Schmitt | ...................... | 119/14.52 |
| 2,935,964 A * | 5/1960 | Pickavance et al. | ........ | 119/14.52 |
| 3,557,755 A * | 1/1971 | Close | .......................... | 119/14.49 |
| 4,352,234 A * | 10/1982 | Noorlander | ...................... | 29/450 |
| 4,964,368 A * | 10/1990 | Ball et al. | .................... | 119/14.49 |
| 2007/0157887 A1* | 7/2007 | Fernandez | ................. | 119/14.49 |
| 2008/0035064 A1* | 2/2008 | Petterson et al. | ........... | 119/14.47 |

FOREIGN PATENT DOCUMENTS

| | | |
|---|---|---|
| EP | 0 908 091 | 4/1999 |
| WO | 03/024203 | 3/2003 |
| WO | 2005/120216 | 12/2005 |
| WO | 2005/120217 | 12/2005 |

OTHER PUBLICATIONS

International Search Report dated Aug. 28, 2007, from corresponding PCT application.

* cited by examiner

*Primary Examiner* — Rob Swiatek
*Assistant Examiner* — Ebony Evans
(74) *Attorney, Agent, or Firm* — Young & Thompson

(57) ABSTRACT

A teatcup and a teatcup liner are described. The teatcup liner (3) is adapted to be mounted in a shell (2) to form a teatcup (1) to be applied to a teat of an animal. The teatcup liner (3) defines a length axis (4) and an inner space (5) for receiving the teat, and includes a barrel (8) and an upper head (6) for receiving the teat, wherein the barrel (8) has an end portion (12) on which a primary engagement member (13) is arranged. The teatcup liner (3) includes a hindering member (15) arranged on the side of the primary engagement member (13) being distant from the upper head (6), hindering the primary engagement member (13) to bend away from the upper head, wherein the hindering member (15) has a smaller extension from the length axis (4) perpendicular to the length axis (4) compared with the primary engagement member.

41 Claims, 3 Drawing Sheets

TEATCUP

TECHNICAL FIELD

The present invention relates to a teatcup to be applied to a teat of an animal, to a teatcup liner adapted to be mounted in a shell to form the teatcup, a teatcup shell adapted to receive a teatcup liner. The present invention also relates to a method for mounting a teatcup liner in a teatcup shell. The teatcup liner defines an inner space for receiving the teat, and comprises an upper head for receiving the teat and a lower barrel, comprising a primary engagement member adapted to be in engagement with a secondary engagement member of the shell.

BACKGROUND OF THE INVENTION AND PRIOR ART

Teatcup liners are typically manufactured in a natural or synthetic rubber material. Rubber materials have many advantages connected to the elastic properties of rubber. These elastic properties are advantageous both during the manufacturing of the teatcup liner and during milking. The teatcup liner formed in a mould can easily be removed from the mould and the core shaping the inner space of the teatcup liner after the vulcanisation. However, the vulcanisation of the rubber requires a significant vulcanisation time before the rubber can be removed from the mould and the core. This is a limiting factor in the manufacturing of teatcup liners.

In order to speed up the manufacturing process, it is proposed to manufacture teatcup liners in a plastic material, i.e. Thermo Plastic Elastomers, TPE. The solidification time needed after moulding of such a plastic material is significantly shorter than the vulcanisation time needed for a rubber material. Consequently, by using such a thermoplastic material in the teatcup liner it would be possible to speed up the manufacturing thereof. A further advantage of a thermoplastic material is that it may be re-used. However, the elasticity of thermoplastic materials is generally smaller than the elasticity of rubber, which means that a teatcup liner with a conventional design would be difficult to mount in a teatcup shell.

It has been realised that a higher flexibility regarding the selection of material or materials in the teatcup liner may be achieved if the teatcup liner is manufactured as a number of separate components, which are then connected to each other when the teatcup liner is mounted.

The swedish patent application 0401484-1 discloses a teatcup of the kind initially defined. The teatcup includes a teatcup liner and a shell. The teatcup liner includes a first component forming a head portion and a second component forming a barrel portion, which second component also comprises a lower portion with an engagement member. The engagement member has the form of a flange. The first and second components are joined to each other by means of a snap joint or a thread joint so that either one of them can be changed when so required, while the lower portion is attached to the barrel portion by a melt joint. The teatcup liner of this prior art document is mounted in a shell, wherein the barrel portion is positioned in the shell. The lower portion of the barrel portion is gripped by a lower end of the shell. In order to make the engagement member of the shell to engage the engagement member of the lower portion of the barrel portion, the engagement member of the barrel portion is pulled below the engagement member of the shell.

There is, however, a need for an alternative solution to the engagement member described in the prior art.

SUMMARY OF THE INVENTION

An object of the present invention is to provide a teatcup shell, a teatcup liner and a teatcup which are alternatives to the teatcups and the teatcup liners of the prior art.

Another object of the present invention is to provide a method for mounting a teatcup liner in a teatcup shell to form a teatcup which is an alternative to the methods of the prior art.

A further object of the present invention is to provide a teatcup liner with a primary engagement member which may easily be installed in a teatcup shell.

A further object of the present invention is to provide a teatcup shell with a secondary engagement member which allows a teatcup liner to be easily installed in the teatcup shell.

Still another object of the present invention is to provide a teatcup liner which may be securely installed in a teatcup shell requiring only a low pulling force to be installed.

Still a further object of the present invention is to provide a teatcup in which the teatcup liner may be easily replaced with a minimum of pulling force on the liner.

At least one of these objects is achieved with a teatcup liner, a teatcup shell, a teatcup and a method according to the independent claims.

Further advantages are achieved with the features in the dependent claims.

A basic idea of the present invention is to provide a teatcup liner or a teatcup shell with an engagement member which may bend more easily in one direction than in the other direction.

A teatcup liner according to a first aspect of the present invention is adapted to be mounted in a shell to form a teatcup to be applied to a teat of an animal. The teatcup liner defines a length axis and an inner space for receiving the teat, and comprises a barrel and an upper head for receiving the teat, wherein the barrel has an end portion on which a primary engagement member is arranged, wherein the primary engagement member is adapted to be in engagement with a secondary engagement member arranged on the shell, and wherein the primary engagement member is bendable towards the upper head. The teatcup liner is characterised in that the teatcup liner comprises a hindering member arranged on a side of the primary engagement member being distant from the upper head, thereby hindering the primary engagement member to bend away from the upper head, wherein the hindering member has a smaller extension from the length axis perpendicular to the length axis compared with the engagement member.

A teatcup liner according to the present invention may be easily installed in a teatcup shell while still providing a secure installation. The primary engagement member in the teatcup liner according to the invention may easily bend during installation but will provide a secure installation due to the hindering member.

When the teatcup liner is to be installed in a shell the upper head is fastened in the part of the shell being distant from the secondary engagement member. In order to allow the primary engagement member to engage the primary engagement member of the shell the teatcup has to be stretched so that the primary engagement member passes the secondary engagement member as is known in the art. When the primary engagement member and the secondary engagement member are engaged they will be pushed against each other by the tension in the stretched teatcup liner.

The primary engagement member may consist of a flexible ring surrounding the end portion of the barrel. By having this form the primary engagement member also serves as a sealing preventing air from entering the space between the teatcup liner and the shell. In case the sealing between the teatcup liner and the shell is provided by other means it is possible for the primary engagement member to have other forms such as, e.g., studs surrounding the end portion of the barrel.

The hindering member may consist of a ring surrounding the end portion of the barrel. In case the hindering member has such a form the hindering member will support the primary engagement member evenly when the primary engagement member engages the secondary engagement member.

As an alternative the hindering member may consist of a number of studs arranged surrounding the end portion of the teatcup liner. In case they are arranged evenly around the end portion they will provide sufficient support for the engagement member.

The hindering member may be an integral part of the end portion. By having the hindering member as an integral part of the end portion manufacturing of the end portion is facilitated. It is, however, possible to manufacture the hindering member as a separate part which is attached to the end portion.

The end portion of the teatcup liner and the barrel of the teatcup liner may both consist of a first material. As an alternative the barrel of the teatcup liner comprises a first material and the end portion of the barrel comprises a second material. By manufacturing the barrel and the end portion of different materials it is possible to optimise the mechanical properties of each one of the barrel and the end portion. The barrel is preferably made of an elastic material to allow the barrel to be stretched during installation of the teatcup liner in a shell. The end portion and the barrel are then manufactured as separate parts which are later joined by melting.

The manufacturing of the entire teatcup liner in the same material results in a more easy manufacturing.

The end portion of the barrel may consist only of the second material. Alternatively, the barrel may comprise a number of different materials to optimise the mechanical properties of different parts of the barrel.

The second material may have a lower elasticity than the first material. This is advantageous in that the barrel is required to be able to stretch during installation in a shell, while the end portion and the hindering means are required to provide a secure engagement with the hindering means of the shell.

There are a wide variety of materials that may be suitable as the first material and the second material. The second material may, e.g., comprise a thermoplastic material. Thermoplastic materials has a number of advantages as the second material, one advantage being that they may be re-used. An example for the second material is polypropylene.

Also the first material may comprises a thermoplastic material. Even if polypropylene may be used for the first material it is favourable if the first material is more elastic as mentioned above. A favourable choice for the first material is santopren.

The end portion of the barrel may preferably include a grip member extending from the end portion in a direction away from the upper head and being adapted to be gripped by an operator and, when the teatcup liner is to be mounted in the shell, to be manoeuvred by a pulling movement in relation to the shell in such a manner that the barrel is stretched and the primary engagement member is engaged by the secondary engagement member. With such a grip member the installation of the teatcup liner in the shell is facilitated. The distance between the primary engagement member and the hindering member parallel to the length axis may be smaller than the extension of the primary engagement member perpendicularly to the length axis. This provides for the engagement member coming in contact with the hindering member when it bends.

The distance between the primary engagement member and the hindering member parallel to the length axis may be between 0.1 and 10 millimeters, preferably 0.1-2 millimeters and most preferred 0.2-0.5 millimeters. The mentioned intervals have shown to provide a reliable engagement of the primary engagement member and the secondary engagement member.

The extension, perpendicularly to the length axis, of the primary engagement member from the barrel may be 0.1-10 mm, preferably 0.5-5 millimeters and most preferred 2-5 millimeters. The mentioned intervals have shown to provide a reliable engagement of the primary engagement member and the secondary engagement member.

The primary engagement member may comprise a first portion extending essentially perpendicular to the length axis from the end portion of the teatcup liner, and a second portion, extending essentially parallel to the length axis from the end of the first portion, being distant from the end portion, and being adapted to be in engagement with a groove in the secondary engagement member, wherein the cross section, parallel to the length axis, of the primary engagement member essentially has an L-form. With such a form on the primary engagement member the engagement between the primary engagement member and the secondary engagement member becomes secure. The sealing between the engagement member and the engagement member of the shell also becomes more effective.

According to a second aspect of the present invention a teatcup is provided comprising a shell and a teatcup liner according to the description above.

According to a third aspect of the present invention a teatcup shell is provided which is adapted to receive a teatcup liner to form a teatcup to be applied to a teat of an animal, the teatcup shell defining a length axis, an inner space for receiving the teatcup liner, and an inner side. The teatcup shell comprises a first end for receiving an upper head of the teatcup liner, a second end and an end portion at the second end, wherein a secondary engagement member is arranged on the inner side of the end portion, wherein the secondary engagement member is adapted to be in engagement with a primary engagement member arranged on the teatcup liner, and wherein the secondary engagement member is bendable towards the second end. The teatcup shell is characterised in that a hindering member is arranged on the inner side of the teatcup shell on a side of the secondary engagement member being distant from the second end, thereby rendering the secondary engagement member less prone to bend away from the second end than towards the second end.

This arrangement of the hindering member on the teatcup shell instead of on the teatcup liner does not change the function of the teatcup.

The hindering member may have a smaller extension perpendicular to the length axis compared with the primary engagement member with the same advantages as described for the equivalent feature in the teatcup liner according to the first aspect of the present invention.

The secondary engagement member may consist of a flexible ring with the same advantages as described for the equivalent feature in the teatcup liner according to the first aspect of the present invention.

The hindering member may consist of a ring with the same advantages as described for the equivalent feature in the teatcup liner according to the first aspect of the present invention.

The hindering member may consist of a number of studs arranged on the inner side of the end portion of the teatcup shell with the same advantages as described for the equivalent feature in the teatcup liner according to the first aspect of the present invention The hindering member may be an integral part of the end portion with the same advantages as described for the equivalent feature in the teatcup liner according to the first aspect of the present invention.

The hindering member may be detachable from the teatcup liner with the same advantages as described for the equivalent feature in the teatcup liner according to the first aspect of the present invention.

The secondary engagement member may comprise a first material and the hindering member comprises a second material with the same advantages as described for the equivalent feature in the teatcup liner according to the first aspect of the present invention.

The second material may have a lower elasticity than the first material with the same advantages as described for the equivalent feature in the teatcup liner according to the first aspect of the present invention.

The second material may comprise a thermoplastic material with the same advantages as described for the equivalent feature in the teatcup liner according to the first aspect of the present invention.

The second material may comprise polypropylene with the same advantages as described for the equivalent feature in the teatcup liner according to the first aspect of the present invention.

The first material may comprise a thermoplastic material with the same advantages as described for the equivalent feature in the teatcup liner according to the first aspect of the present invention.

The second material may comprise polypropylene with the same advantages as described for the equivalent feature in the teatcup liner according to the first aspect of the present invention.

The distance between the secondary engagement member and the hindering member parallel to the length axis may be smaller than the extension of the secondary engagement member perpendicularly to the length axis with the same advantages as described for the equivalent feature in the teatcup liner according to the first aspect of the present invention.

The distance between the secondary engagement member and the hindering member parallel to the length axis is between 0.1 and 10 millimeters, preferably 0.1-2 millimeters and most preferred 0.2-0.5 millimeters with the same advantages as described for the equivalent feature in the teatcup liner according to the first aspect of the present invention.

The extension, perpendicularly to the length axis, of the secondary engagement member from the barrel may be 0.1-10 mm, preferably 0.5-5 millimeters and most preferred 2-5 millimeters, with the same advantages as described for the equivalent feature in the teatcup liner according to the first aspect of the present invention.

The secondary engagement member may comprise a first portion extending essentially perpendicular to the length axis from the end portion of the teatcup liner, and a second portion, extending essentially parallel to the length axis from the end of the first portion being distant from the end portion, and being adapted to be in engagement with a groove in the primary engagement member, wherein the cross section, parallel to the length axis, of the secondary engagement member essentially has an L-form with the same advantages as described for the equivalent feature in the teatcup liner according to the first aspect of the present invention.

According to a fourth aspect of the present invention a teatcup comprising a teatcup liner and a shell according to the third aspect of the present invention is provided.

According to a fifth aspect of the present invention a teatcup arranged to be applied to a teat of an animal, and comprising a teatcup liner, a shell and a length axis, is provided. The teatcup liner defines an outer side, and an inner space for receiving the teat, and comprises a barrel and an upper head for receiving the teat, wherein the barrel has an end portion on the outer side of which a primary engagement member is arranged. The teatcup shell defines an inner space in which the teatcup liner is arranged, and an inner side, and comprises a first end at which the upper head of the teatcup liner is arranged, a second end and an end portion at the second end. A primary engagement member is arranged on the inner side of the end portion, wherein the primary engagement member is in engagement with the secondary engagement member, so that the secondary engagement member is closer to the upper head than the primary engagement member. The teatcup is characterized in that at least one of the engagement members is bendable in the direction towards the other engagement member, and that a hindering member is arranged on a side of the bendable engagement member being distant from the other engagement member along the length axis, thereby rendering the bendable engagement member less prone to bend away from the other engagement member than towards the other engagement member.

The teatcup according to the fifth aspect of the present invention de facto comprises a teatcup according to the third aspect of the present invention or a teatcup liner according to the first aspect of the present invention. Thus the inventive feature with the hindering member is provided on one of the teatcup liner and the teatcup shell.

According to a sixth aspect of the present invention a method is provided for mounting a teatcup liner in a shell comprising a first end, a second end and an end portion at the second end, to form a teatcup to be applied to a teat of an animal. The teatcup liner defines an inner space for receiving the teat, and an outer side and comprises a barrel and an upper head for receiving the teat, wherein the barrel has an end portion on the outer side of which a primary engagement member is arranged, wherein the primary engagement member is adapted to be in engagement with a secondary engagement member arranged on the end portion of the shell, and wherein the secondary engagement member is bendable towards the second end. The method is characterized by the steps of arranging a hindering member on the inner side of the teatcup shell on a side of the secondary engagement member being distant from the second end, arranging the teatcup liner in the teatcup shell with the upper head in contact with the first end and the barrel extending through the teatcup shell, and pulling the end portion so that the primary engagement member passes the secondary engagement member and engages the secondary engagement member, wherein the hindering member renders the secondary engagement member less prone to bend away from the second end than towards the second end.

The method according to the sixth aspect of the invention the hindering member is a lose part which is arranged after the teatcup liner has been arranged in the teatcup shell. Thus, the method may be used also with teatcup liners and teatcup shells not having any permanently attached hindering member.

According to a seventh aspect of the present invention a method is provided for mounting a teatcup liner in a shell comprising a first end, a second end and an end portion at the second end, to form a teatcup to be applied to a teat of an animal. The teatcup liner defines an inner space for receiving the teat, and an outer side and comprises a barrel and an upper head for receiving the teat, wherein the barrel has an end portion on the outer side of which a primary engagement member is arranged, wherein the primary engagement member is adapted to be in engagement with a secondary engagement member arranged on the end portion of the shell, and wherein the first engagement member is bendable towards the upper head. The method is characterized by the steps of arranging the teatcup liner in the teatcup shell with the upper head in contact with the first end and the barrel extending through the teatcup shell, arranging a hindering member on the outer side of the teatcup liner on a side of the primary engagement member being distant from the upper head, thereby rendering the primary engagement member less prone to bend away from the upper head than towards the upper head, and pulling the end portion so that the primary engagement member passes the secondary engagement member and engages the secondary engagement member.

It is possible to perform the steps in a different order.

The method according to the seventh aspect of the invention the hindering member is a lose part which is arranged after the teatcup liner has been arranged in the teatcup shell. Thus, the method may be used also with teatcup liners and teatcup shells not having any permanently attached hindering member.

In the following preferred embodiments of the invention will be described with reference to the appended drawings.

SHORT DESCRIPTION OF THE DRAWINGS

Figure 1:
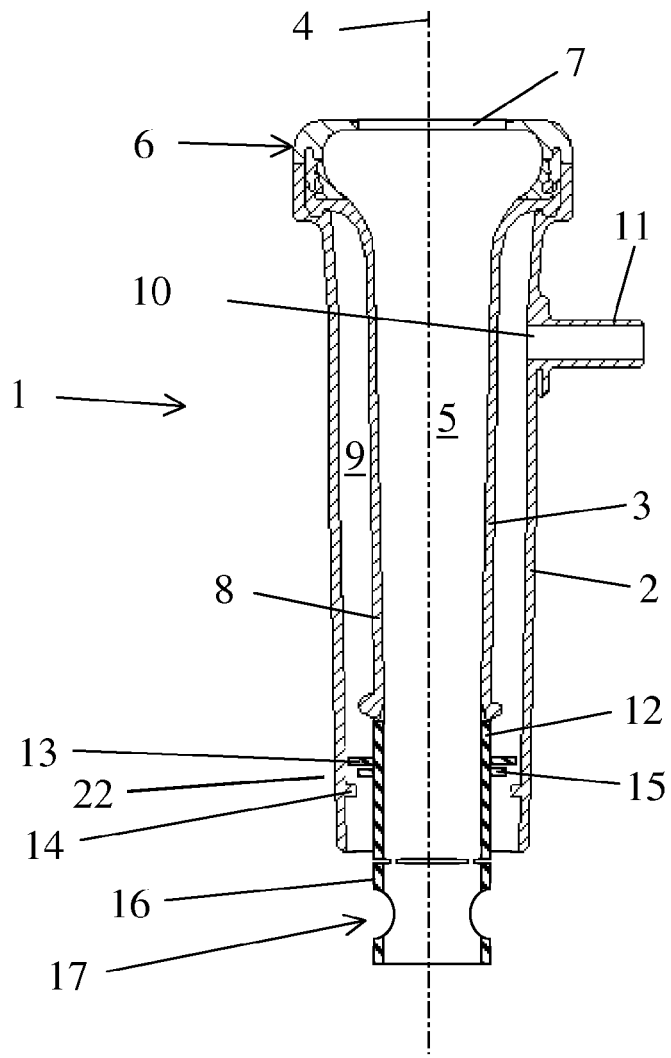
FIG. 1 shows a teatcup comprising a teatcup shell and a teatcup liner having a barrel and an end portion, according to an embodiment of the invention.

DESCRIPTION OF PREFERRED
EMBODIMENTS OF THE INVENTION

In the following description of preferred embodiments of the invention similar features will be denoted with the same reference numeral in the different figures.

FIG. 1 shows in cross section a teatcup 1 according to an embodiment of the present invention. The teatcup 1 comprises a shell 2 and a teatcup liner 3, which defines a length axis 4 and an inner space 5. The teatcup liner 3 comprises an upper head 6 with an opening 7 for receiving the teat and a barrel 8. A pulsation chamber 9 is formed between the shell 2 and the teatcup liner 3. The pulsation chamber 9 is accessible via an aperture 10, which in the embodiment disclosed is formed by a pulsation nipple 11. In use the teatcup is intended to be mounted in a holding device (not disclosed), which connects the inner space 5 of the teatcup to a milk conduit (not disclosed) for the application of a low pressure or vacuum and for the transport of milk from the teat present in the inner space 5. The pulsation nipple 11 may be directly connected to a pulsation connector provided on the holding device.

The teatcup liner 3 shown in FIG. 1 includes a primary component which forms the upper head 6 and a secondary component which forms the barrel 8 and an end portion 12, but may alternatively be formed as a single component. The end portion 12 is manufactured as a separate component which is joined to the barrel 8 through melting of the mating surfaces of the end portion 12 and the barrel 8. The end portion comprises a primary engagement member 13 which is adapted to be in engagement with a secondary engagement member 14 arranged on the shell 2, and wherein the primary engagement member 13 is arranged to bend towards the upper head 6 when acted upon with a force towards the upper head 6. The end portion 12 also comprises a hindering member 15 arranged at a small distance from the primary engagement member 13. The hindering member is arranged to hinder the primary engagement member 13 from being bent away from the upper head 6 when acted upon with a force directed away from the upper head 6. The primary engagement member 13, the primary engagement member 14 of the shell 2, as well as the hindering member 15, have in the shown embodiment, the form of rings surrounding the length axis 4. The inner diameter of the secondary engagement member 14 of the shell 2 is larger than the outer diameter of the hindering member 15 but smaller than the outer diameter of the primary engagement member 13.

The end portion 12 also comprises a grip member 16 extending away from the upper head 6 and being adapted to be gripped by an operator. To this end the grip member 16 comprises a through going hole 17 to be gripped by the operator. The grip member 16 is attached to the rest of the end portion 12 only by narrow bridge portions 18.

When the teatcup liner 3 is to be mounted in the shell 2 the grip member is manoeuvred by a pulling movement in relation to the shell 2 in such a manner that the barrel 8 is stretched and the primary engagement member 13 comes into contact with the secondary engagement member 14. When the pulling movement continues the secondary engagement member 14 acts with a force on the primary engagement member 13 towards the upper head 6 so that the primary engagement member 13 may bend towards the upper head 6 and pass the secondary engagement member 14. When the pulling movement is discontinued the primary engagement member 13 is engaged by the secondary engagement member 14 as the hindering member 15 hinders the primary engagement member 13 from bending away from the upper head 6. When the primary engagement member 13 is engaged by the secondary engagement member 14 the grip member may be removed from the rest of the end portion 12 by cutting the bridge portions 18.

Figure 2:
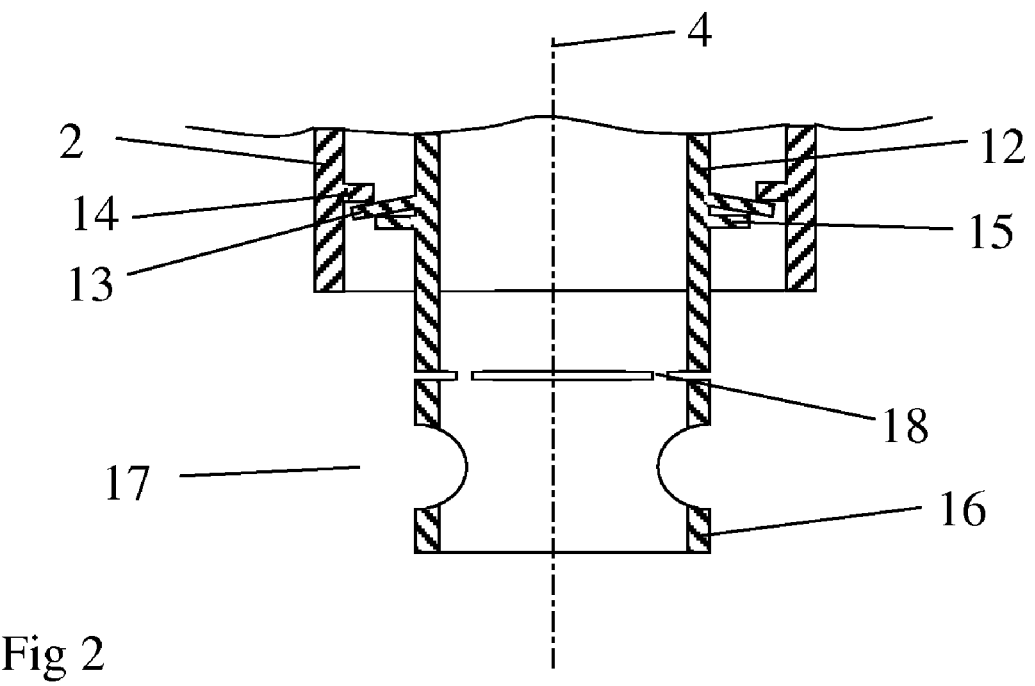
FIG. 2 shows in larger detail the end portion of the barrel of a teatcup liner according to a first embodiment of the present invention.

FIG. 2 shows in larger detail the end portion 12 of the teatcup liner with a part of the shell 2, when the primary engagement member 13 is in engagement with the secondary engagement member 14. The primary engagement member 13 has been pulled past the secondary engagement member 14 and is in contact with the secondary engagement member 14. Due to the tension in the barrel 8 of the teatcup liner 3 the secondary engagement member 14 presses against the primary engagement member 13 so that the primary engagement member 13 is bent and comes in contact with the hindering member 15, which hinders the primary engagement member 13 from bending further.

The extension of the primary engagement member 13 perpendicularly to the length axis 4 is between a tenth of a millimeter to a few millimeters and preferably a few millimeters. The extension of the primary engagement member 13 as well as the extension of the hindering member 15 along the length axis 4 is between a tenth of a millimeter to a few millimeters and preferably a few millimeters. The distance between the hindering member 15 and the primary engagement member 13 along the length axis 4 is in the shown embodiment smaller than the extension of the primary engagement member 13 along the length axis 4, as well as the extension of the hindering member 15 along the length axis 4.

Figure 3:
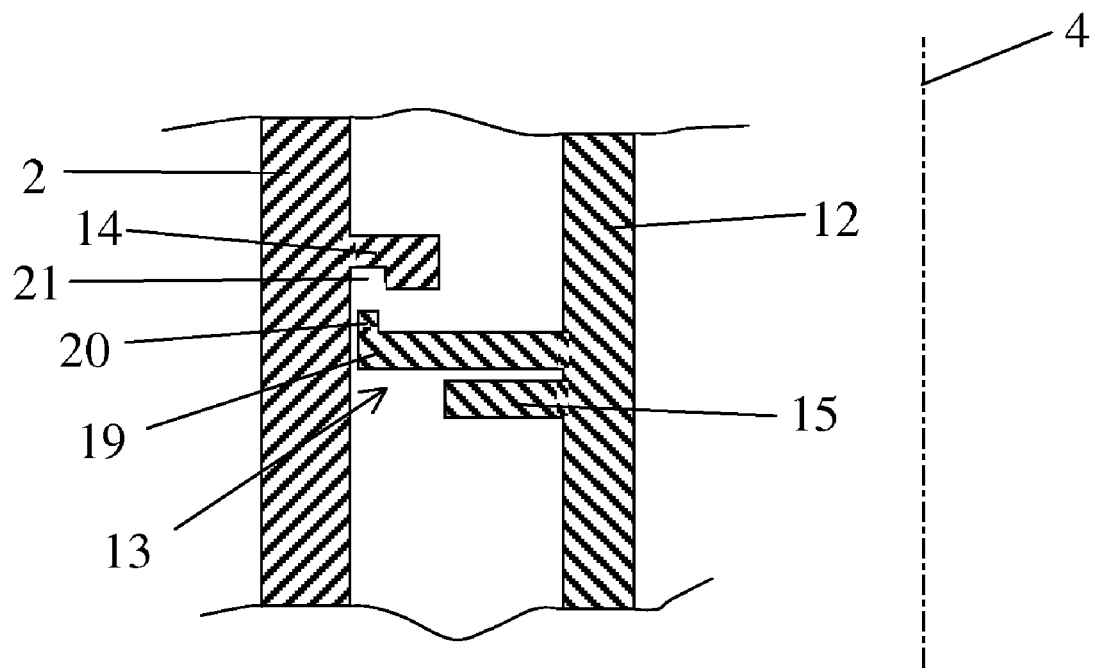
FIG. 3 shows in larger detail a part of the primary engagement member and the secondary engagement member arranged on the shell according to a second embodiment of the present invention.

FIG. 3 shows in larger detail a part of the primary engagement member 13 and the secondary engagement member 14 according to a second embodiment of the present invention. The primary engagement member 13 differs from the engagement member 13 shown in FIG. 2 in that the primary engagement member 13 comprises a first portion 19 extending essentially perpendicularly to the length axis 4 and being in contact with the end portion of the teatcup liner, and a second portion 20, extending essentially parallel to the length axis 4 from the end of the first portion. The secondary engagement member 14 comprises a groove 21. The second portion 20 of the primary engagement member 13 is distant from the end portion 12 and is adapted to be in engagement with the groove 21. The cross section of the primary engagement member 13, parallel to the length axis 4, has essentially an L-form. The second portion 20 of the primary engagement member 13 in combination with the groove 21 of the secondary engagement member 14 leads to a secure engagement between the primary engagement member 13 and the secondary engagement member 14.

Figure 4:
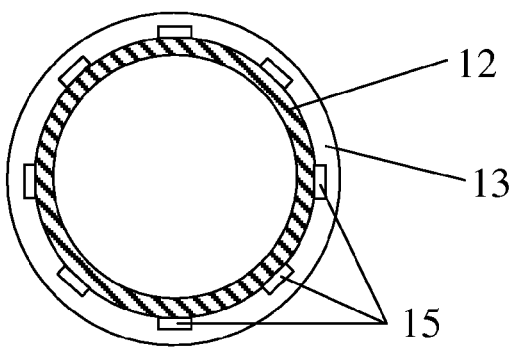
FIG. 4 shows a part of the end portion of a teatcup liner according to a third embodiment of the present invention.

FIG. 4 shows a part of the end portion of a teatcup liner according to a third embodiment of the present invention. In contrast to FIG. 1, FIG. 2 and FIG. 3, FIG. 4 is a cross section perpendicularly to the length axis 4 (FIG. 1) shown in the direction towards the upper head 6 (FIG. 1). The teatcup liner has a tube formed end portion 12 on which a primary engagement member 13 is arranged surrounding the end portion 12. A hindering member 15 in the form of a number of studs are arranged surrounding the end portion 12.

The end portion 12 with the primary engagement member 13 as well as the barrel 8 may be made of a variety of materials. The barrel 8 and the end portion may consist of the same material but may also comprise different materials. It is advantageous to make the barrel of a first material and the end portion of a second material, wherein the second material has a lower elasticity than the first material. Both materials are preferably thermoplastic materials.

Figure 5:
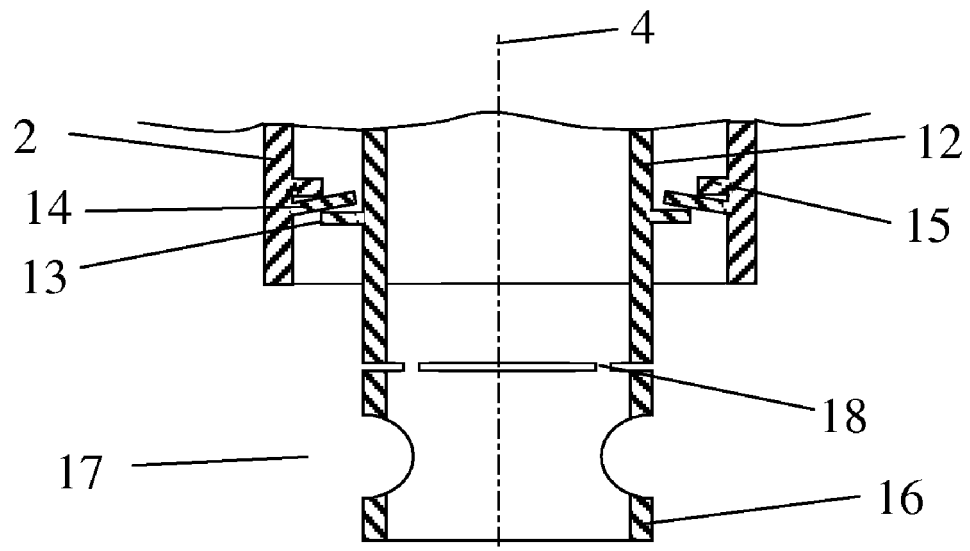
FIG. 5 shows in larger detail an end portion of a teatcup liner with a part of a shell according to a third embodiment of the present invention.

FIG. 5 shows in larger detail an end portion 12 of a teatcup liner with a part of the shell 2 according to a third embodiment of the present invention, when the primary engagement member 13 is in engagement with the secondary engagement member 14. In contrast to the embodiments described above, the hindering member 15 is arranged on the shell 2 in the embodiment shown in FIG. 5. The primary engagement member 13 has been pulled past the secondary engagement member 14 and is in contact with the secondary engagement member 14. Due to the tension in the barrel 8 of the teatcup liner 3 the primary engagement member 13 presses against the secondary engagement member 14 so that the secondary engagement member 14 is bent and comes in contact with the hindering member 15, which hinders the secondary engagement member 14 from bending further.

The extension of the secondary engagement member 14 perpendicularly to the length axis 4 is between a tenth of a millimeter to a few millimeters and preferably a few millimeters. The extension of the primary engagement member 13 as well as the extension of the hindering member 15 along the length axis 4 is between a tenth of a millimeter to a few millimeters and preferably a few millimeters. The distance between the hindering member 15 and the secondary engagement member 14 along the length axis 4 is, in the embodiment shown in FIG. 5, smaller than the extension of the secondary engagement member 14 along the length axis 4, as well as the extension of the hindering member 15 along the length axis 4.

Figure 6:
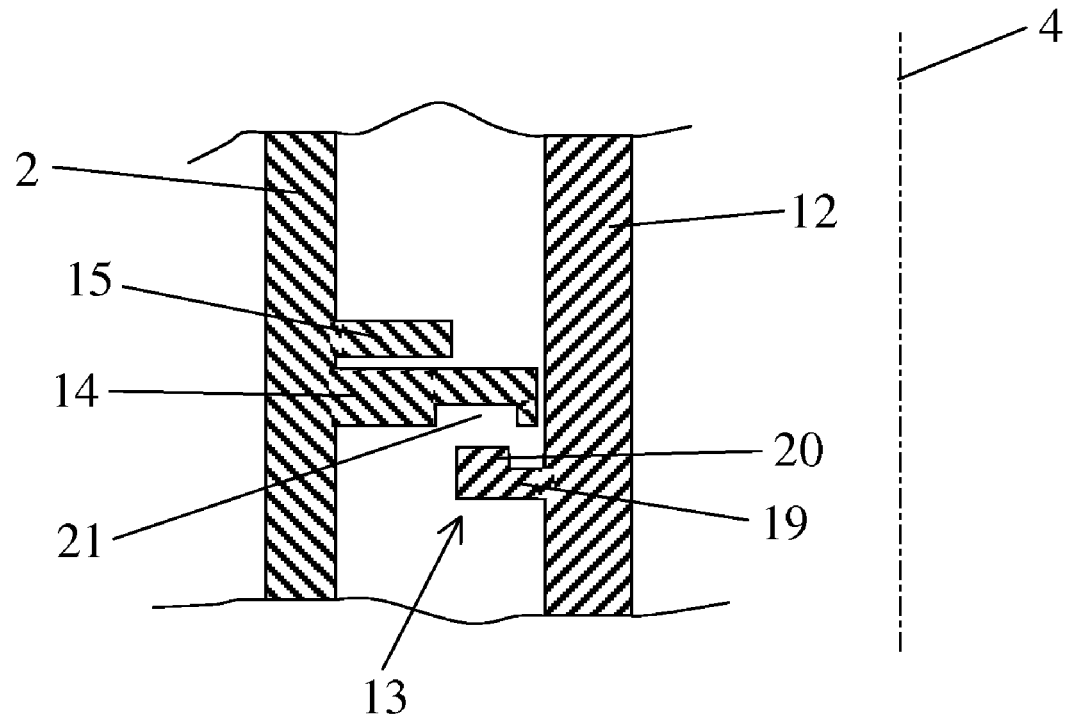
FIG. 6 shows in larger detail a part of the primary engagement member and the secondary engagement member according to a fourth embodiment of the present invention.

FIG. 6 shows in larger detail a part of the primary engagement member 13 and the secondary engagement member 14 according to a fourth embodiment of the present invention. The embodiment shown in FIG. 6 differs from the embodiment shown in FIG. 3 in that the hindering member 15 is arranged on the shell. The primary engagement member 13 comprises a first portion 19 extending essentially perpendicularly to the length axis 4 and being in contact with the end portion of the teatcup liner, and a second portion 20, extending essentially parallel to the length axis 4 from the end of the first portion. The secondary engagement member 14 comprises a groove 21. The second portion 20 of the primary engagement member 13 is distant from the end portion 12 and is adapted to be in engagement with the groove 21. The second portion 20 of the primary engagement member 13 in combination with the groove 21 of the secondary engagement member 14 leads to a secure engagement between the primary engagement member 13 and the secondary engagement member 14.

The above described embodiments may be amended in many ways without departing from the spirit and scope of the present invention which is limited only by the appended claims.

It is possible to use other materials than the ones mentioned above.

In case the teatcup liner comprises a grip member it may have other forms than has been described above.

The invention claimed is:

1. A teatcup liner (3) adapted to be mounted in a shell (2) to form a teatcup (1) to be applied to a teat of an animal, the teatcup liner (3) defining a length axis (4), an inner space (5) for receiving the teat, and an outer side and comprising:
a barrel (8); and
an upper head (6) for receiving the teat,
wherein the barrel (8) has an end portion (12) with an outer side, and a primary engagement member (13) arranged on the outer side of the end portion (12) of the barrel (8) of the teatcup liner (3),
wherein the primary engagement member (13) is adapted to be in engagement with a secondary engagement member (14) arranged on the shell (2),
wherein the primary engagement member (13), when engaged with the secondary member (14), is bendable towards the upper head (6),
wherein a hindering member (15) is arranged on the outer side of the end portion (12) of the barrel (8) of the teatcup liner (3) on a first side of the primary engagement member (13) being distant from the upper head (6), the hindering member being spaced apart from the primary engagement member along the outer side of the end portion of the barrel, the hindering member (15) rendering the primary engagement member (13) less prone to bend away from the upper head (6) than to bend towards the upper head, and when the primary engagement member (13) is engaged with the secondary member (14), the primary member (13) is located intermediate the secondary member (14) and the hindering member (15).

2. The teatcup liner (3) according to claim 1, wherein the hindering member (15) has a smaller extension perpendicular to the length axis (4) compared with the primary engagement member (13).

3. The teatcup liner (3) according to claim 1, wherein the primary engagement member (13) consists of a flexible ring surrounding the end portion (12) of the barrel (8).

4. The teatcup liner (3) according to claim 1, wherein the hindering member (15) consists of a ring surrounding the end portion (12) of the barrel (8).

5. The teatcup liner (3) according to claim 1, wherein the hindering member (15) consists of a number of studs arranged surrounding the end portion (12) of the barrel (8).

6. The teatcup liner (3) according to claim 1, wherein the hindering member (15) is an integral part of the end portion (12) of the barrel (8).

7. The teatcup liner according to claim 1, wherein the hindering member (15) is detachable from the teatcup liner.

8. The teatcup liner (3) according to claim 1, wherein the end portion (12) of the barrel (8) and an end portion of the teatcup liner (3) both consist of a first material.

9. The teatcup liner (3) according to claim 8, wherein the first material comprises a thermoplastic material.

10. The teatcup liner (3) according to claim 1, wherein the barrel (8) of the teatcup liner (3) comprises a first material and the end portion of the barrel (8) comprises a second material.

11. The teatcup liner (3) according to claim 10, wherein the second material has a lower elasticity than the first material.

12. The teatcup liner (3) according to claim 10, wherein the second material comprises a thermoplastic material.

13. The teatcup liner (3) according to claim 10, wherein the second material comprises polypropylene.

14. The teatcup liner (3) according to claim 10, wherein end portion (12) of the barrel (8) consists only of the second material.

15. The teatcup liner (3) according to claim 1, wherein the end portion (12) of the barrel (8) includes a grip member (16) extending from the end portion in a direction away from the upper head (6) and being adapted to be gripped by an operator and, when the teatcup liner (3) is to be mounted in the shell (2), to be maneuvered by a pulling movement in relation to the shell (2) in such a manner that the barrel (8) is stretched and the primary engagement member (13) is engaged by the secondary engagement member (14).

16. The teatcup liner (3) according to claim 1, wherein the distance between the primary engagement member (13) and the hindering member (15) parallel to the length axis (4) is smaller than the extension of the primary engagement member (13) perpendicularly to the length axis (4).

17. The teatcup liner (3) according to claim 1, wherein the distance between the primary engagement member (13) and the hindering member parallel to the length axis (4) is between 0.1 and 10 millimeters.

18. The teatcup liner (3) according to claim 1, wherein the extension, perpendicularly to the length axis (4), of the primary engagement member (13) from the barrel is 0.1-10 mm.

19. The teatcup liner (3) according to claim 1, wherein the primary engagement member (13) comprises a first portion (19) extending essentially perpendicular to the length axis (4) from the end portion (12) of the barrel of the teatcup liner, and a second portion (20), extending essentially parallel to the length axis (4) from the end of the first portion (19) being distant from the end portion (12), and being adapted to be in engagement with a groove (21) in the secondary engagement member (14), wherein the cross section, parallel to the length axis (4), of the primary engagement member (13) essentially has an L-form.

20. A teatcup (1) comprising a shell (2) and a teatcup liner (3) according to claim 1.

21. A teatcup shell (2) adapted to receive a teatcup liner (3) to form a teatcup (1) to be applied to a teat of an animal, the teatcup shell (2) defining a length axis (4), an inner space (5) for receiving the teatcup liner, and an inner side, and comprising a first end for receiving an upper head (6) of the teatcup liner (3), a second end and an end portion (22) at the second end, wherein a secondary engagement member (14) is arranged on the inner side of the end portion, wherein the secondary engagement member (14) is adapted to be in engagement with a primary engagement member (13) arranged on the teatcup liner (2), the primary engagement member being below the secondary engagement member and a hindering a member and wherein, the secondary engagement member (14) is bendable towards the second end, the hindering member (15) is arranged on the inner side of the teatcup shell (2) spaced apart from the secondary engagement along the inner side of the teatcup shell on a side of the secondary engagement member (14) being distant from the second end, thereby rendering the secondary engagement member (14) less prone to bend away from the second end than towards the second end.

22. The teatcup shell (2) according to claim 21, wherein the hindering member (15) has a smaller extension perpendicular to the length axis (4) compared with the primary engagement member (13).

23. The teatcup shell (2) according claim 21, wherein the secondary engagement member (14) consists of a flexible ring.

24. The teatcup shell (2) according to claim 21, wherein the hindering member (15) consists of a ring.

25. The teatcup shell (2) according to claim 21, wherein the hindering member (15) comprises a number of studs arranged on the inner side of the end portion (22) of the teatcup shell (3).

26. The teatcup shell (2) according to claim 21, wherein the hindering member (15) is an integral part of the end portion (22) of the teatcup shell (3).

27. The teatcup shell according to claim 21, wherein the hindering member (15) is detachable from the teatcup shell.

28. The teatcup shell (2) according to claim 21, wherein the secondary engagement member comprises a first material and the hindering member comprises a second material.

29. The teatcup shell (2) according to claim 28, wherein the second material has a lower elasticity than the first material.

30. The teat-cup shell (2) according to claim 29, wherein the second material comprises polypropylene.

31. The teatcup shell (2) according to claim 28, wherein the second material comprises polypropylene.

32. The teatcup shell (2) according to claim 28, wherein the first material comprises a thermoplastic material.

33. The teatcup shell (2) according to claim 28, wherein the second material comprises a thermoplastic material.

34. The teatcup shell (2) according to claim 21, wherein the distance between the secondary engagement member (13) and the hindering member (15) parallel to the length axis (4) is smaller than the extension of the secondary engagement member (13) perpendicularly to the length axis (4).

35. The teatcup shell (2) according to claim 21, wherein the distance between the secondary engagement member (13) and the hindering member (15) parallel to the length axis (4) is between 0.1 and 10 millimeters.

36. The teatcup shell (2) according to claim 21, wherein the extension, perpendicularly to the length axis (4), of the secondary engagement member (13) from the barrel is 0.1-10 mm.

37. The teatcup shell (2) according to claim 21, wherein the secondary engagement member (13) comprises a first portion (19) extending essentially perpendicular to the length axis (4) from the end portion (12) of the teatcup liner, and a second portion (20), extending essentially parallel to the length axis (4) from the end of the first portion (19) being distant from the end portion (12), and being adapted to be in engagement with a groove (21) in the primary engagement member (14), wherein the cross section, parallel to the length axis (4), of the secondary engagement member (13) essentially has an L-form.

38. A teatcup (1) comprising a teatcup liner (3) and a shell according to claim 21.

39. A teatcup (1) arranged to be applied to a teat of an animal, and comprising:
   a teatcup shell (2) defining a length axis (4), and
   a teatcup liner (3), the teatcup liner (3) defining an outer side, and an inner space (5) for receiving the teat, and comprising a barrel (8) and an upper head (6) for receiving the teat,
   wherein the barrel (8) has an barrel end portion (12) and an outer side,
   a primary engagement member (13) arranged on the outer side of the barrel end portion (12) of the teatcup liner (3),
   teatcup shell (2) defining an inner space in which the teatcup liner is arranged, and an inner side, and comprising a first end at which the upper head (6) of the teatcup liner (3) is arranged, a second end and an shell end portion at the second end, wherein a secondary engagement member (14) is arranged on the inner side of the shell end portion, wherein,
   the primary engagement member (13) is in engagement with the secondary engagement member (14) so that the secondary engagement member is closer to the upper head than the primary engagement member,
   at least a first of the engagement members is bendable in the direction towards a second of the engagement members, and
   a hindering member (15) is arranged at a side of the bendable first engagement member being distant from the second engagement member along the length axis, the hindering member (15) thereby rendering the bendable first engagement member (13) less prone to bend away from the second engagement member than towards the second engagement member.

40. Method for mounting a teatcup liner (3) in a teatcup shell (2) comprising a first end, a second end and a shell end portion at the second end, to form a teatcup (1) to be applied to a teat of an animal, the teatcup liner (3) defining an inner space (5) for receiving the teat, and an outer side and comprising a barrel (8) and an upper head (6) for receiving the teat, wherein the barrel (8) has a barrel end portion (12) on the outer side of which a primary engagement member (13) is arranged, wherein the primary engagement member (13) is adapted to be in engagement with a secondary engagement member (14) arranged on the shell end portion, and wherein the secondary engagement member is bendable towards the second end, the method comprising the steps of:
   arranging a hindering member (15) on an inner side of the teatcup shell (2) on a side of the secondary engagement member (14) being distant from the second end, and
   arranging the teatcup liner in the teatcup shell with the upper head in contact with the first end and the barrel extending through the teatcup shell, and pulling the barrel end portion so that the primary engagement member passes the secondary engagement member and engages the secondary engagement member,
   wherein the hindering member renders the secondary engagement member (13) less prone to bend away from the second end than towards the second end.

41. Method for mounting a teatcup liner (3) in a shell (2) comprising a first end, a second end and a shell end portion at the second end, to form a teatcup (1) to be applied to a teat of an animal, the teatcup liner (3) defining an inner space (5) for receiving the teat, and an outer side and comprising a barrel (8) and an upper head (6) for receiving the teat, wherein the barrel (8) has a barrel end portion (12) on the outer side of which a primary engagement member (13) is arranged, wherein the primary engagement member (13) is adapted to be in engagement with a secondary engagement member (14) arranged on the shell end portion, and wherein the primary engagement member is bendable towards the upper head (6), the method comprising the steps of:
   arranging the teatcup liner in the teatcup shell with the upper head in contact with the first end and the barrel extending through the teatcup shell,
   arranging a hindering member (15) on the outer side of the teatcup liner (3) on a side of the primary engagement member (13) being distant from the upper head (6), the hindering member being spaced apart from the primary engagement member along the outer side of the end portion of the barrel, the hindering member thereby rendering the primary engagement member (13) less prone to bend away from the upper head (6) than towards the upper head, and pulling the barrel end portion so that the primary engagement member passes the secondary engagement member and engages the secondary engagement member with the primary engagement member (13) engaged with the secondary member (14), the primary member (13) is located intermediate the secondary member (14) and the hindering member (15).

\* \* \* \* \*